United States Patent
Kacewicz et al.

(10) Patent No.: US 9,310,500 B2
(45) Date of Patent: Apr. 12, 2016

(54) VELOCITY MODELS FOR PROCESSING SEISMIC DATA BASED ON BASIN MODELING

(71) Applicants: Marek Kacewicz, Sugarland, TX (US); Sankar Kumar Muhuri, Houston, TX (US); Weihong Fei, Sugarland, TX (US)

(72) Inventors: Marek Kacewicz, Sugarland, TX (US); Sankar Kumar Muhuri, Houston, TX (US); Weihong Fei, Sugarland, TX (US)

(73) Assignee: Chevron U.S.A. Inc., San Ramon, CA (US)

(*) Notice: Subject to any disclaimer, the term of this patent is extended or adjusted under 35 U.S.C. 154(b) by 461 days.

(21) Appl. No.: 13/771,780

(22) Filed: Feb. 20, 2013

(65) Prior Publication Data

US 2014/0233352 A1    Aug. 21, 2014

(51) Int. Cl.
*G01V 1/30* (2006.01)
*G01V 99/00* (2009.01)

(52) U.S. Cl.
CPC .............. *G01V 1/303* (2013.01); *G01V 99/005* (2013.01)

(58) Field of Classification Search
CPC .............................. G01V 1/303; G01V 99/005
USPC .......................................................... 367/73
See application file for complete search history.

(56) References Cited

U.S. PATENT DOCUMENTS

| | | | |
|---|---|---|---|
| 4,943,950 A * | 7/1990 | Beasley et al. ................. 367/50 | |
| 6,751,558 B2 | 6/2004 | Huffman et al. | |
| 7,280,918 B2 | 10/2007 | Williams | |
| 7,355,923 B2 | 4/2008 | Reshef et al. | |
| 8,098,543 B2 * | 1/2012 | Bachrach et al. ............... | 367/73 |
| 8,121,791 B2 | 2/2012 | Lazaratos et al. | |
| 8,203,907 B2 | 6/2012 | Krebs et al. | |
| 8,275,589 B2 | 9/2012 | Montaron et al. | |
| 2002/0120429 A1 | 8/2002 | Ortoleva | |
| 2009/0303834 A1 | 12/2009 | Sengupta et al. | |
| 2010/0074053 A1 | 3/2010 | Jaiswal et al. | |
| 2012/0195165 A1 | 8/2012 | Vu et al. | |

OTHER PUBLICATIONS

Albertin the time for Depth Imaging Albertin et al. 2002.
Notfors Anisotropic Prestack Imaging in Practice Notfors et al. 2004.
Tsvankin Seismic anisotropy in exploration and reservoir characterization: An overview Tsvankin et al. 2007.
Epili Improved subsalt imaging using TTI anisotropy and reverse time migration scans Epili et al. 2011.
A.G. Madatov, The overpressure driven seismic velocity response. The review of standard models and methods for extraction in the contextof basin modelling approach to overpressure prediction, ВесТНик МГТу, TOM 8, No 1, 2005 г. СТР.84-119.
Dutta, Geopressure prediction using seismic data: Current status and the road ahead, Geophysics, vol. 67, No. 6 (Nov.-Dec. 2002); p. 2012-2041.

(Continued)

*Primary Examiner* — Daniel L Murphy
(74) *Attorney, Agent, or Firm* — Yalei Sun; Marie L. Clapp

(57) ABSTRACT

A method of developing a velocity model for processing a seismic dataset is implemented at a computer system having a processor and memory. The method includes: deriving a first velocity model from the seismic dataset; building a basin model based on the first velocity model and interpretation of the seismic dataset; validating the basin model using calibration data; deriving a second velocity model from the validated basin model; and updating the first velocity model based, at least in part, on the second velocity model.

13 Claims, 9 Drawing Sheets

(56) References Cited

OTHER PUBLICATIONS

Lopez et al., Integrated shared earth model: 3D pore-pressure prediction and uncertainty analysis, The Leading Edge Jan. 2004, pp. 52-54.

Petmecky et al., Improving sub-salt imaging using 3D basin model derived velocities, Marine and Petroleum Geology 26 (2009) 457-463.

Madatov A.G., The effective basin model concept and fast 3-D overpressure modelling in basin time scale, 2005.

\* cited by examiner

VELOCITY MODELS FOR PROCESSING SEISMIC DATA BASED ON BASIN MODELING

TECHNICAL FIELD

The disclosed implementations relate generally to seismic data processing, and in particular, to systems and methods for improving the velocity models used for processing seismic data (e.g., imaging, tomography, etc.) based on basin modeling.

BACKGROUND

Seismic imaging is a methodology of moving seismic events recorded on the surface to locations at which the events occurred in the subsurface, thereby creating a more accurate image of the subsurface. A high-quality seismic image is beneficial for reducing the oil and gas exploration risk and minimizing the number of drilled dry holes, which is especially true as petroleum exploration migrates towards the imaging of sub-salt reservoirs. A precondition for producing a high-quality seismic image (especially a depth image of complex geological structures such as faults, salt bodies, folding, etc.) from a seismic dataset is to have an accurate velocity model. Traditionally, the velocity model used by seismic imaging is developed from the seismic dataset itself, e.g., using seismic tomography, constrained by a limited amount of non-seismic data such as well log data and lab test results. As a result, the velocity model tends to be static one because it is built on top of only currently available information without leveraging information associated with the geological, geomechanical, or diagenetic history of rocks within a particular region.

Basin modeling (or petroleum system modeling) is a tool used for analyzing the formation and the evolution of a sedimentary basin, processing information from multiple geological disciplines, and creating visual models for characterizing, e.g., the burial history, thermal history, maturity history, as well as expulsion, migration and trapping of hydrocarbons within a region. From analyzing these models, people can make inferences about matters such as hydrocarbon generation and timing, maturity of potential source rocks and migration paths of expelled hydrocarbons. But so far, the basin modeling technique has found little use in improving the velocity model used for seismic imaging.

SUMMARY

In accordance with some implementations described below, a method of developing a velocity model for processing a seismic dataset is implemented at a computer system having a processor and memory. The method includes (i) deriving a first velocity model from the seismic dataset, (ii) building a basin model based on the first velocity model and interpretation of the seismic dataset, (iii) validating the basin model using calibration data, (iv) deriving a second velocity model from the validated basin model; and (v) updating the first velocity model based, at least in part, on the second velocity model.

In some implementations, the first velocity model is generated by seismic tomography of the seismic dataset. In such implementations, building the basin model includes (i) generating a seismic image from the seismic dataset using the first velocity model, (ii) identifying geological structures in the seismic image, and (iii) building the basin model using the identified geological structures and non-seismic data, the non-seismic data including at least one of the following: (i) lab testing results, (ii) one or more petrophysical properties derived from well log data, and (iii) mechanical earth models.

In some implementations, validating the basin model includes deriving geophysical data from the basin model at one or more predefined locations. Such predefined locations include at least one of a well location, a pseudo-well location, a particular horizon, and a 2D/3D geobody. In such implementations, the validating further includes comparing the derived geophysical data with calibration data and modifying the basin model using at least some of the calibration data when there is a mismatch between the geophysical data derived from the basin model and the calibration data at the predefined locations in accordance with one or more predefined criteria.

In some implementations, deriving the second velocity model further includes extracting effective stress data from the validated basin model and transforming the effective stress data into the second velocity model using one or more transform functions. Such transform functions are generated from petrophysical analysis of well data and available analogs as well as the seismic dataset and non-seismic data. In some implementations, the transform functions are generated by initially building one or more rock property cubes using the seismic dataset and the non-seismic data. The rock property cubes track geomechanics, burial history, stratigraphy, and diagenesis. Rock properties are extracted from the rock property cubes corresponding to predefined locations such as horizons, well locations, pseudo-well locations, and 2D/3D geobodies. The transform functions are then defined using the extracted rock properties at the predefined locations.

In some implementations, updating the first velocity model further includes generating a difference between the first velocity model and the second velocity model and identifying regions in the first velocity model that require further investigation. Such regions include areas where the difference between the first velocity model and the second velocity model is higher than a predefined threshold level. Updating the first velocity model further includes modifying at least one of the identified regions in the first velocity model using the second velocity model and smoothing the modified first velocity model.

In some implementations, updating the first velocity model further includes determining a measure of gather flatness for common image gathers in the seismic dataset. The common image gathers are generated from a region in the first velocity model that requires further investigation. When the measure of gather flatness satisfies a predefined error level, the region in the first velocity model is kept; when the measure of gather flatness does not satisfy the predefined error level, the region in the first velocity model is replaced with the corresponding region in the second velocity model. The modified first velocity model is then smoothed.

In some implementations, updating the first velocity model further includes identifying a mudline in the first velocity model using the seismic dataset and non-seismic data and the mudline has a predefined depth in the first velocity model below which the first velocity model is deemed to be unreliable. In such implementations, the first velocity model below the predefined depth horizon is replaced with the corresponding portion of the second velocity model. The modified first velocity model is then smoothed.

In some implementations, updating the first velocity model further includes choosing a region in the first velocity model that corresponds to a 2D/3D geobody and assigning velocities from the second velocity model to the chosen region. The modified first velocity model is then smoothed.

In some implementations, the calibration data is generated by modifying the first velocity model using the seismic dataset and non-seismic data and identifying one or more reference regions in the modified first velocity model where there are mismatches between the first velocity model and the basin model. Velocities are extracted from the modified first velocity model corresponding to the identified reference regions and transformed into pressure data as part of the calibration data.

In accordance with some implementations described below, a computer system for developing a velocity model for processing a seismic dataset is provided. The computer system comprises memory, one or more processors, and one or more program modules stored in the memory. The program modules, when executed by the one or more processors, are configured to cause the one or more processors to perform certain operations. One such operation is deriving a first velocity model from the seismic dataset. Another such operation is building a basin model based on the first velocity model and interpretation of the seismic dataset. Another operation is computation of overburden, pore pressure and effective stress. Still another such operation is validating the basin model using calibration data and deriving a second velocity model from the validated basin model. Yet another such operation is updating the first velocity model based, at least in part, on the second velocity model.

In accordance with some implementations described below, a non-transitory computer readable storage medium, storing one or more programs for execution by one or more processors of a computer system for developing a velocity model for processing a seismic dataset is provided. The one or more programs include instructions for performing the following certain operations. One such operation is deriving a first velocity model from the seismic dataset. Another such operation is building a basin model based on the first velocity model and interpretation of the seismic dataset. Another such operation is computation of overburden, pore pressure and effective stress. Still another such operation is validating the basin model using calibration data and deriving a second velocity model from the validated basin model. Yet another such operation is updating the first velocity model based, at least in part, on the second velocity model.

In sum, techniques disclosed in the present application can be used for developing a more accurate velocity model, which can then be used for generating a more accurate seismic image. The accuracy of the velocity model is not only based on the seismic data but also calibrated using non-seismic data. In particular, by updating the velocity model in the context of a dynamic geological evolution process, basin modeling makes unique contributions to improving the velocity model, which are missing from the seismic data alone.

BRIEF DESCRIPTION OF DRAWINGS

The aforementioned implementation of the invention as well as additional implementations will be more clearly understood as a result of the following detailed description of the various aspects of the invention when taken in conjunction with the drawings. Like reference numerals refer to corresponding parts throughout the several views of the drawings.

DETAILED DESCRIPTION

As noted above, the result of seismic imaging is dependent on the accuracy of the velocity model used by seismic imaging. The more complex the geological structure of a region is, the more important the accuracy of the velocity model is for producing an accurate seismic image. Conversely, the resultant seismic image is also useful for improving the velocity model. For example, from analyzing a seismic image, an interpreter can identify major geological structures in the image and determine how well the seismic events are focused in the image. Such interpretation result may then lead to an improved velocity model, which is then used for producing a more accurate image. Therefore, seismic imaging and velocity modeling are often characterized as a bootstrapping process that may iterate through multiple rounds until desired results are achieved.

Figure 1:
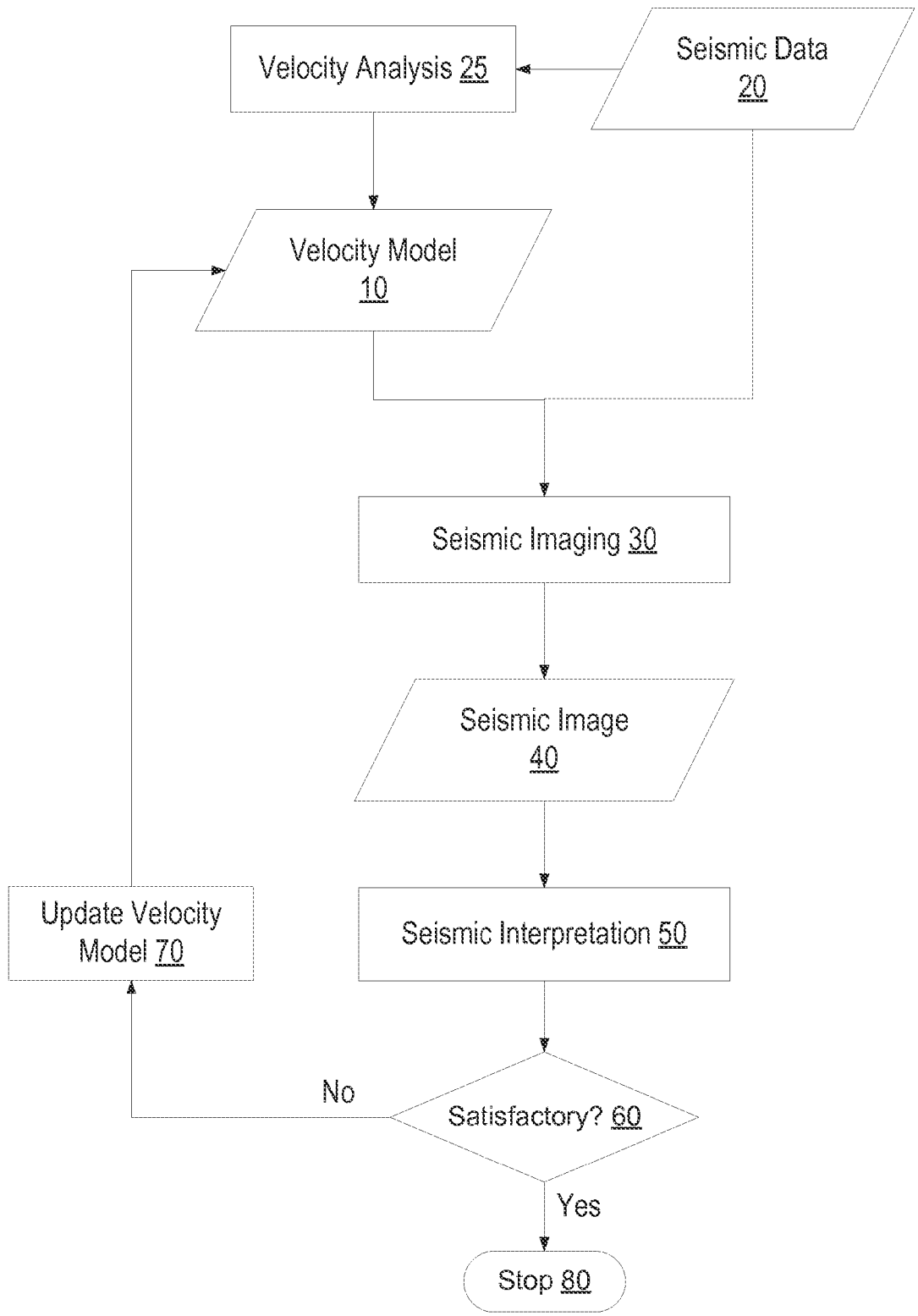
FIG. 1 is a flow chart illustrating a process of performing seismic imaging and velocity model estimation on an iterative basis in accordance with some implementations.

FIG. 1 is a flow chart illustrating a process of performing seismic imaging and velocity model estimation iteratively in accordance with some implementations. Note that a 2D or 3D seismic dataset is often subject to one or more pre-processing steps (not shown in the figure) before it is in a suitable condition (like seismic data 20 in the figure) for the velocity analysis module 25 and the seismic imaging module 30. Over the years, many methods have been developed for performing velocity analysis, including velocity-spectrum analysis and seismic tomographic velocity analysis, which are well-known to those skilled in the art. After the velocity analysis module 25 generates a velocity model 10 from the seismic data 20, the seismic imaging module 30 can then use the velocity model 10 to perform seismic imaging of the seismic data 20. Like the velocity analysis, there are many known seismic imaging methods, including time migration and depth migration. The output of the seismic imaging module 30 is a seismic image 40, which may be a 2D slice or a 3D cube. From the seismic image 40, an interpreter or an interpretation process can identify locations of major reflectors in the image and use such information for determining the distribution of hydrocarbon resources in the subsurface region. The imaging gather flatness and/or the quality of the seismic image 40 is often a good indicator of the accuracy of the velocity model 10 used by the seismic imaging module 40. If the quality is satisfactory (60, yes), the process may stop (80) the process; otherwise (60, no), the process may move to update the velocity model (70) and provide the updated velocity model to the seismic imaging module 30 for re-imaging the seismic data 20.

Figure 2A:
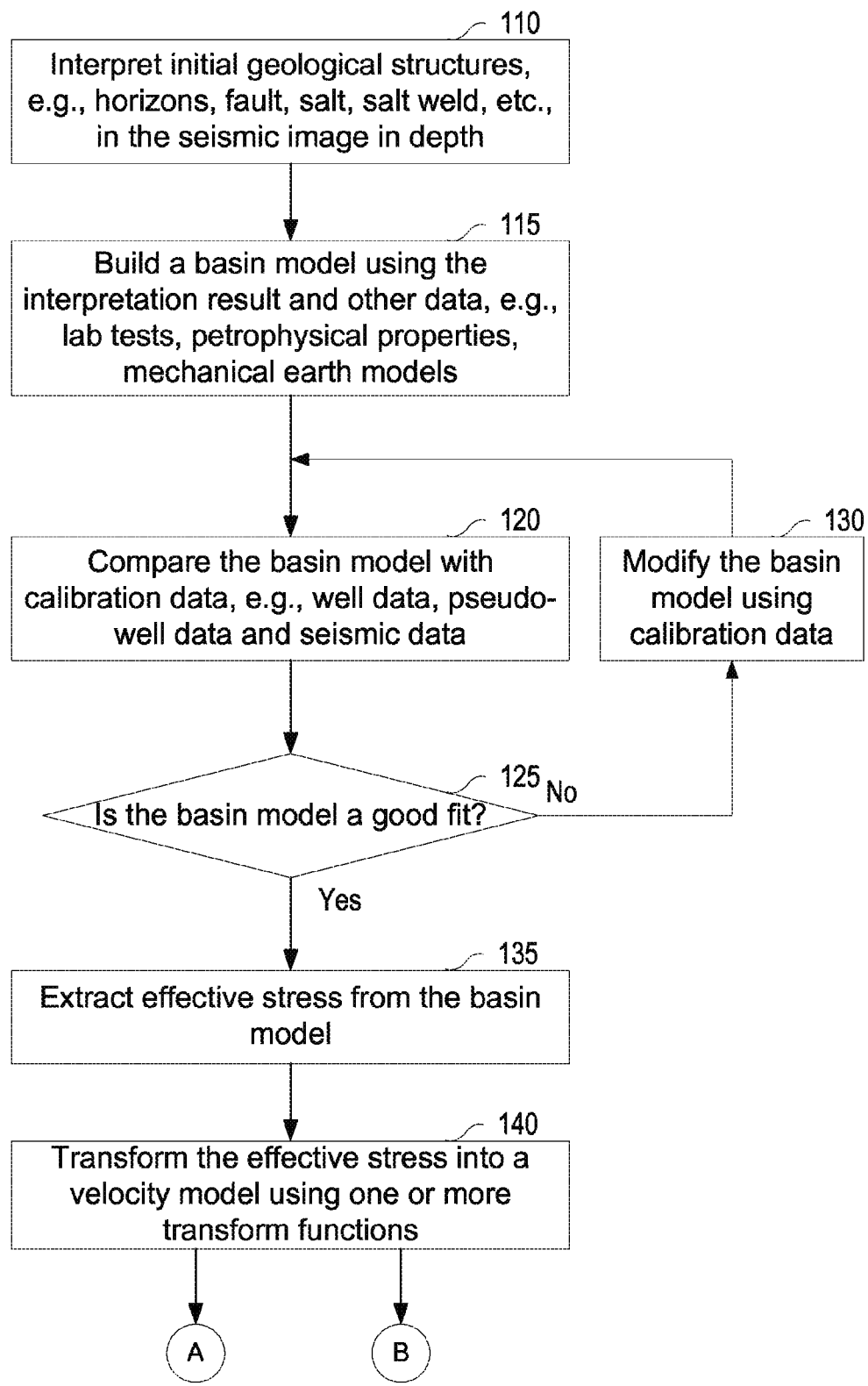
FIG. 2A is a flow chart illustrating a process of building/modifying a basin model and deriving a velocity model from the basin model in accordance with some implementations.

According to some aspects of the present application, velocity model updating is aided by the basin modeling process because the basin modeling process provides the dynamic information of the targeted region absent from the seismic data. FIG. 2A is a flow chart illustrating a process of building/modifying a basin model and deriving a velocity model from the basin model in accordance with some implementations. As shown in the figure, one of the early steps of basin modeling is to interpret (110) the seismic image so as to identify those initial geological structures at different depths in the seismic image. Note that the geological structures are hereby labeled "initial" because they may change as the basin modeling process continues. Representative geological structures may include, but are not limited to, horizons (that may represent reservoir or seal intervals), faults, salts, and salt welds, etc. The complexity of the structures may contribute to the inaccuracy of the velocity model from the seismic data alone and are often poorly imaged as well. However, if they can be appropriately identified in the seismic image and then included in the basin model, the basin modeling process may extend the interpretation result derived from the seismic image and allow the projection of geologically reasonable parameters into areas where the seismic image may be of poor quality, by correlating the basin model with various types of calibration data. In some implementations, such information is used to generate a more accurate velocity model than the velocity model derived from the seismic data alone.

The basin model is built using the interpretation result and other available data, including lab tests, petrophysical properties, and/or mechanical earth models. Over the years, researchers and geologists have developed many basin modeling tools to analyze the conditions within the Earth through history. These tools can be used: (i) in the analysis of hydrocarbons, their generation, migration and accumulation of the volumes that may be potentially recoverable, (ii) in the reconstruction of the structural configuration of an area through time, or (iii) for determining the pressure environment in the subsurface region. A few representative basin modeling tools include BasinMod™ from Platte River Associates, Inc., USA; Temis Suite™ from Beicip-Franlab, France; PetroMod from IES™ (Schlumberger), and Permedia™ (Halliburton), each of which is incorporated into the present application by reference.

The initial basin model derived from the interpretation result is then compared (120) with calibration data to determine whether there is a good fit (125) between the basin model and the calibration data. Representative calibration data includes well data, pseudo-well data, seismic data, hydrocarbon shows, etc. In most of these basin modeling tools, the calibration data (such as porosity, temperature, source rock maturity indicators, pore pressure, and various logs) with which the comparison is made are derived from various external sources and are supplied to the program as input data to which the basin model parameters will be adjusted. If there is a good fit between the basin model and the calibration data (125—yes), e.g., if the difference between the basin model and the calibration data satisfies a predefined threshold level or fit criterion (which typically ranges from 1% to 5%), the basin model is deemed to be sufficiently accurate and the effective stress is then extracted (135) from the basin model and then transformed (140) into a velocity model using one or more transform functions. More details about the transform functions are provided below in connection with FIG. 2B.

If the basin model is not a good fit (125—no), e.g., if the difference between the basin model and the calibration data does not satisfy a predefined threshold level or fit criterion, the process then modifies (130) the basin model using the calibration data. For example, the pressure data at a given well location can be derived from the basin model. The pressure data is then compared with the pressure data measured at the well location. If the two sets of pressure data do not match each other, it means that the basin model needs to be revised by, e.g., modifying the porosity and permeability data of the basin model until the pressure data derived from the basin model agrees with the pressure data measured at the well. Note that these steps (120, 125, and 130) may iterate multiple times until the basin model is deemed to be a good fit for the calibration data. In some implementations, the calibration of the basin model can be achieved through solving an inverse problem.

Note that one or multiple steps are required for converting a basin model, which is a good fit of the calibration data, into a velocity model. For example, the vertical permeability ($K_v$) and horizontal permeability ($K_h$) of the basin model are first used to compute the pressure data. The pressure data is then subtracted from the overburden of the subsurface region to produce the effective stress of the same region. Finally, the effective stress is then transformed into the velocity model using one or more transform functions.

Figure 2B:
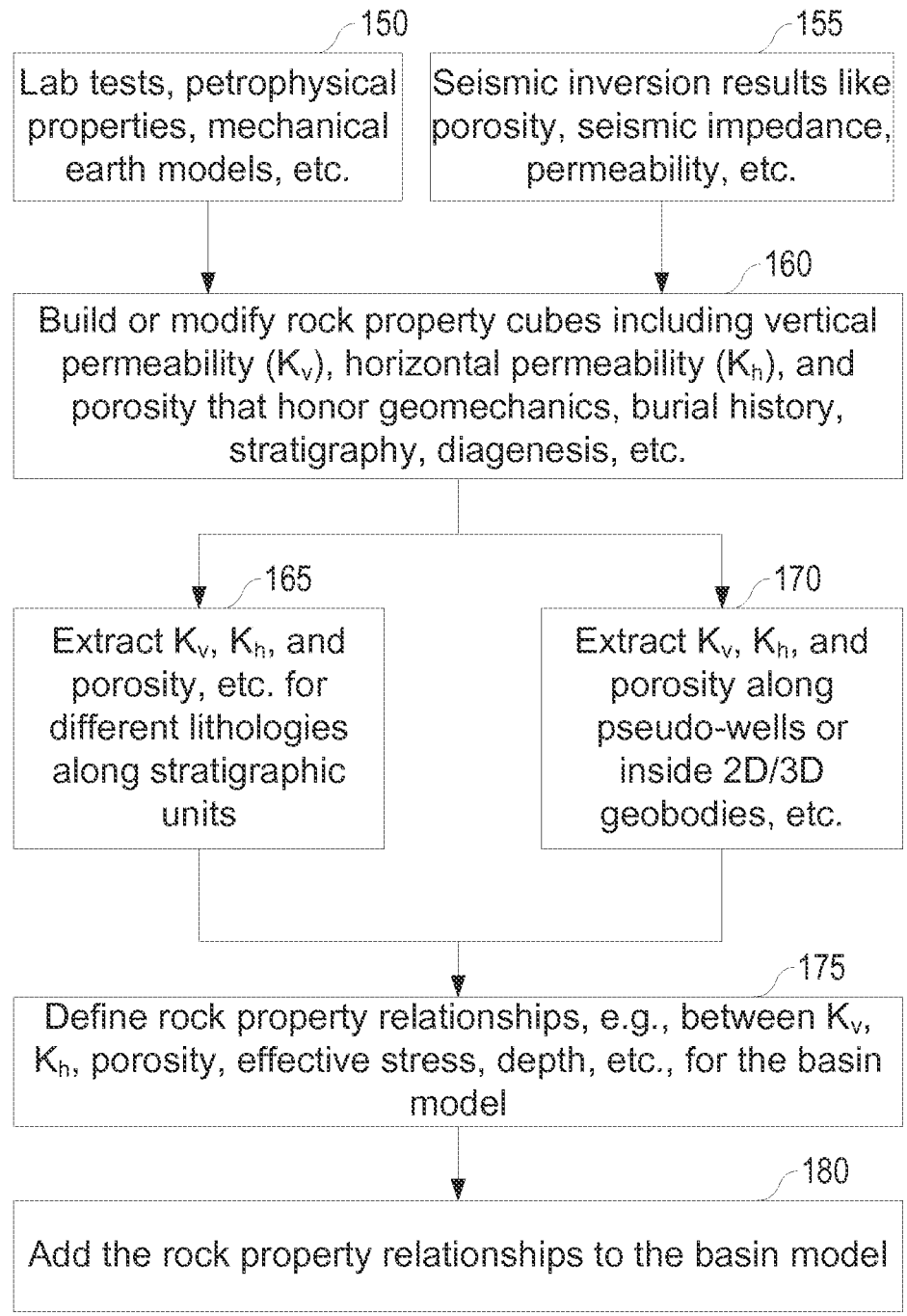
FIG. 2B is a flow chart illustrating a process of building/modifying rock property cubes and deriving velocity transform functions from the rock property cubes in accordance with some implementations.

FIG. 2B is a flow chart illustrating a process of building/modifying rock property cubes and deriving the velocity transform functions from the rock property cubes in accordance with some implementations. In some cases, the input data to this process is put into two different categories: (i) non-seismic data 150 including the lab tests, petrophysical properties, and mechanical earth models and (ii) the seismic inversion results 155 like the porosity, permeability, and seismic impedance, etc.

Using the two types of input data, the process builds (160) one or more rock property cubes that honor different types of geological observations such as geomechanics, burial history, stratigraphy, diagenesis, etc. In some implementations, the rock property cubes include the $K_v$ cube, $K_h$ cube, porosity cube, etc. Like the basin modeling tools, there are many known tools that can be used for building the rock property cubes from the seismic and non-seismic data. For example, GOCAD, available from Paradigm of George Town, Cayman Islands, and Petrel, available from Schlumberger, are commonly used geological modeling software suites and would be appropriate for use in accordance with some implementations of the present invention. Sometimes, different rock property cubes are modified repeatedly until they agree with each other as well as the other geological information.

After generating the rock property cubes, the process proceeds to extract some properties at predefined locations from the rock property cubes. For example, vertical and horizontal permeabilities ($K_v$ and $K_h$) and porosity may be extracted from the corresponding rock property cubes for different lithologies along those stratigraphic units (165), e.g., based on the interpretation result of the seismic image and along the pseudo-well locations or 2D/3D geobodies (170). For illustrative purposes, the extraction of properties for different types of locations is shown separately in FIG. 2B. But one skilled in the art would understand that they may be combined into one step if necessary. After exacting the rock properties at predefined locations in the respective rock property cubes, the process defines (175) one or more relationships between different rock properties, including $K_v$, $K_h$, porosity, effective stress, depth, etc. for the basin model being built. These rock property relationships are then added (180) to the basin model, some of which (e.g., the relationship between the permeabilities and the effective stress) may be used as transform functions for deriving a velocity model from the basin model.

Figure 2C:
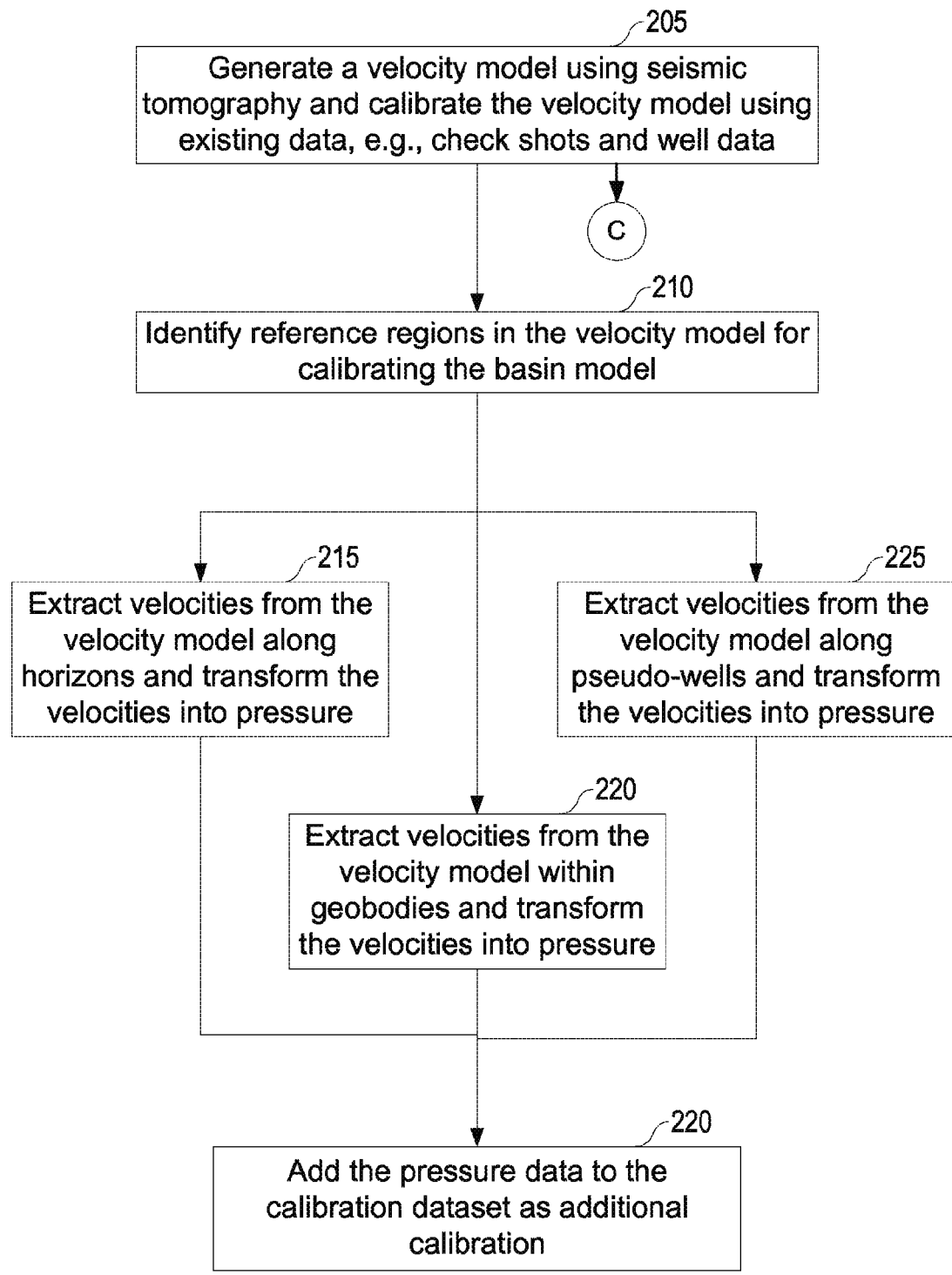
FIG. 2C is a flow chart illustrating a process of generating basin model calibration data from a velocity model based on seismic data in accordance with some implementations.

As noted above, the calibration data used for modifying the basin model may come from different sources, one of which is the seismic data itself. FIG. 2C is a flow chart illustrating a process of generating the basin model calibration data from a velocity model based on the seismic data in accordance with some implementations. In particular, the velocity model generated from the seismic data can be calibrated (205) using other existing data such as check shots and well data. Similarly, the actual well data may be used for modifying the velocity model derived from the seismic data alone.

Next, certain reference regions may be identified (210) in the improved velocity model for calibrating the basin model. In some implementations, the identified regions are those regions in the velocity model that are deemed to be correct but inconsistent with the basin model. In this case, the velocity model is used for generating additional data for calibrating the basin model. For example, the process may extract (215) the velocities from the velocity model along certain horizons identified in the seismic image and then transform the velocities into the pressure data using some of the transform functions described above in connection with FIG. 2B. Similarly, the process may extract the velocities from the velocity model within certain predefined geobodies (220) or pseudo-well locations (225) and then transform them into the pressure data at corresponding locations. The pressure data derived from the velocity model at predefined locations is then added (220) to the calibration dataset as additional calibration data for modifying the basin model when necessary.

Figure 3A:
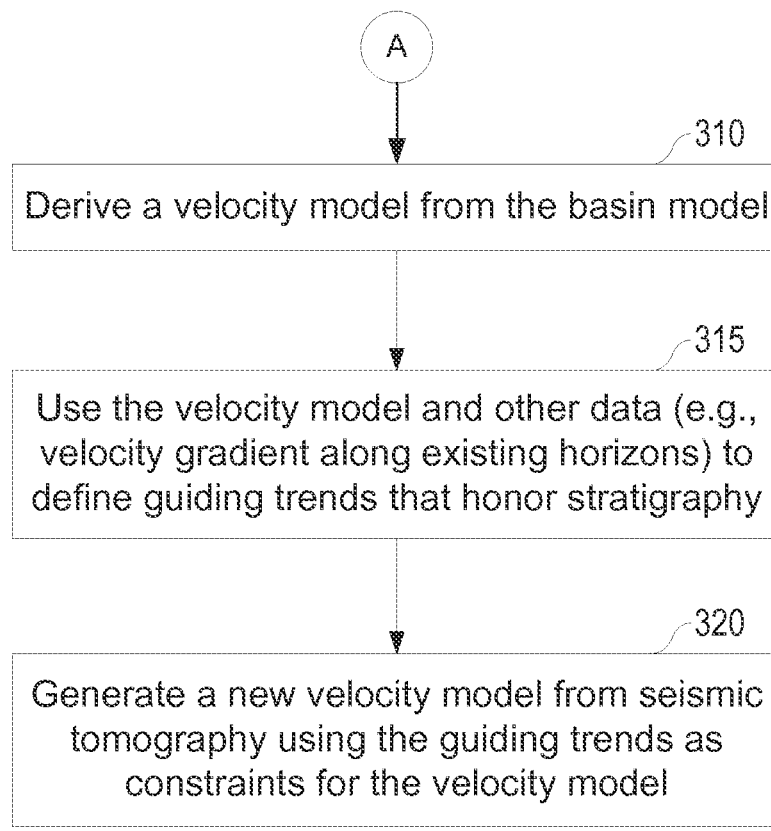
FIG. 3A is a flow chart illustrating a process of improving seismic tomography using a velocity model derived from basin modeling in accordance with some implementations.

The velocity model derived from the basin model shown in FIG. 2A has multiple uses. For example, the velocity model may be used for improving the seismic tomography results. FIG. 3A is a flow chart illustrating a process of improving the seismic tomography using the velocity model derived from basin modeling in accordance with some implementations. After deriving (310) a velocity model from the basin model, a process is employed to use (315) the velocity model as well as data derived from the velocity model (e.g., the velocity gradient along existing horizons) to define certain guiding trends that honor the stratigraphy of the target region. Because the basin modeling process has some stratigraphic information (e.g., from the calibration data) built into the basin model, the basin modeling result allows the projection of geologically reasonable parameters into areas where the seismic image is not satisfactory (e.g., due to poor velocity model).

Using the guiding trends information as constraints, seismic tomography is re-applied to the seismic data to generate (320) a new velocity model that is more accurate than the previous one. In some implementations, the velocity model derived from the basin modeling is used as the initial guess of the velocity model used in seismic tomography. In this case, since the velocity model derived from the basin modeling is not far from the presumptively real velocity model, the seismic tomography should quickly converge to the real velocity model.

Figure 3B:
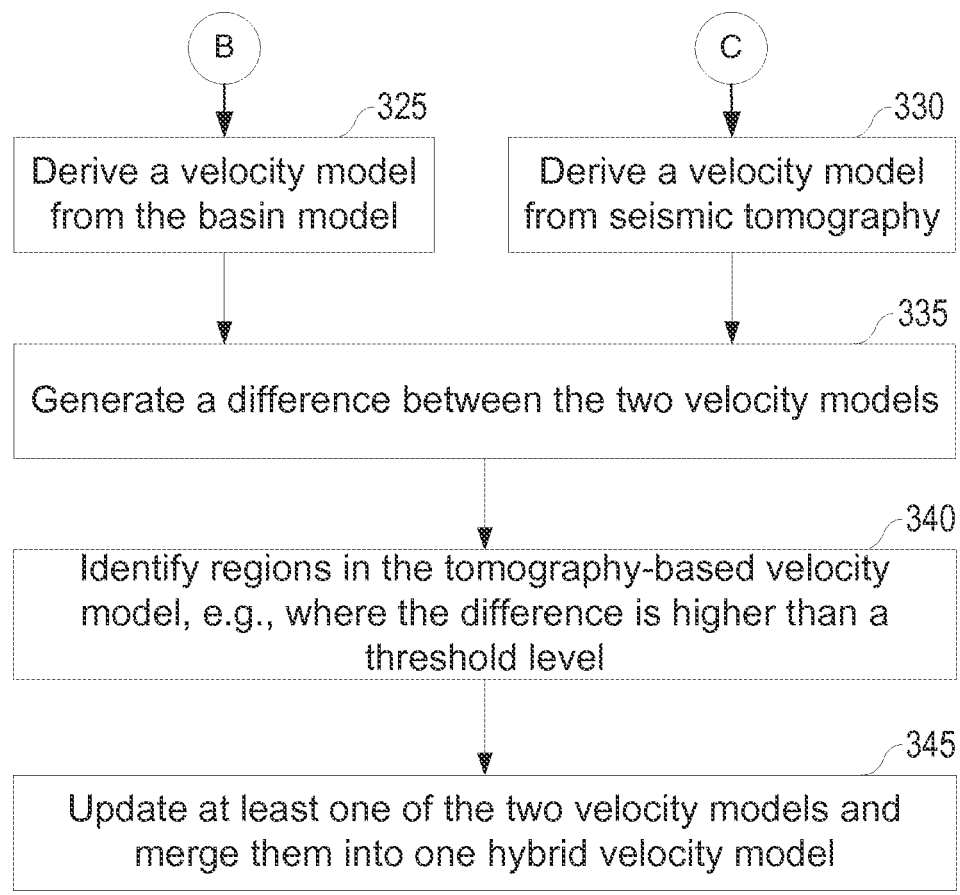
FIG. 3B is a flow chart illustrating a process of updating a seismic tomographic velocity model with a velocity model derived from basin modeling in accordance with some implementations.

Another use of the velocity model derived from the basin modeling process is to improve the quality of seismic image. As described above in connection with FIG. 1, the seismic tomographic velocity model may not be sufficiently accurate in some regions (e.g., regions including complex geological structures). In this case, the basin modeling-based velocity model can be used for updating the seismic tomographic velocity model so as to improve its accuracy. FIG. 3B is a flow chart illustrating a process of updating the seismic tomographic velocity model with the velocity model derived from basin modeling in accordance with some implementations. The process first derives (325) a velocity model from the basin model and derives (330) another velocity model from seismic tomography. Next, the process generates (335) a difference between the two velocity models, e.g., by subtracting the basin model-based velocity model from the seismic tomographic velocity model. The difference between the two velocity models highlights regions where the two velocity models disagree with each other. In some implementations, the process further identifies (340) regions in the seismic tomographic velocity model, e.g., where the difference between the two velocity models is higher than a predefined threshold level (e.g., 5% of the velocity). In general, the identified regions where the two velocity models disagree with each other are often those regions that require further update. However, the fact that the two velocity models agree with each other within a particular region does not guarantee that the two velocity models are both correct in that region. It is possible that both velocity models may turn out to be incorrect. Therefore, when the process updates (345) one of the two velocity models (e.g., the seismic tomographic velocity model) with the other one (e.g., the basin model-based velocity model), the focus is not necessarily limited to the regions where the two velocity models disagree with each other. In some implementations, the process starts with the regions where there is significant disagreements and then moves on to other regions (e.g., horizons, geobodies, etc.) even if the two velocity models appear to agree with each other and ultimately merges the two velocity models into one hybrid velocity model.

Figure 3C:
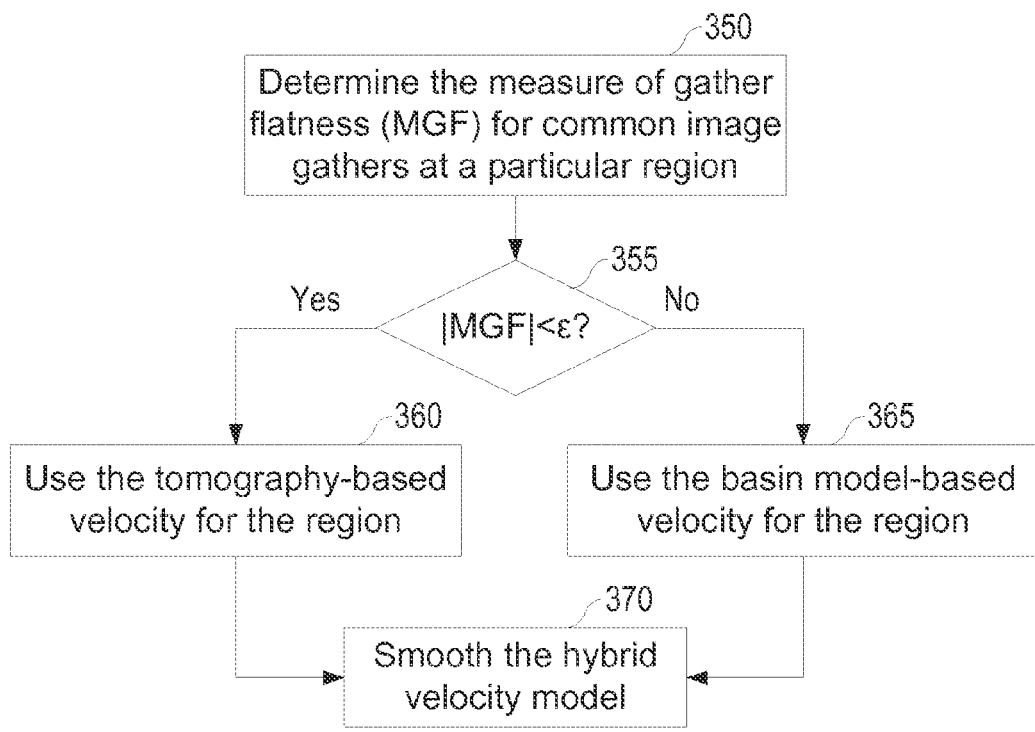
FIGS. 3C-3E are flow charts illustrating respective scenarios of how to update a seismic tomographic velocity model with a velocity model derived from basin modeling in accordance with some implementations.
Figure 3D:
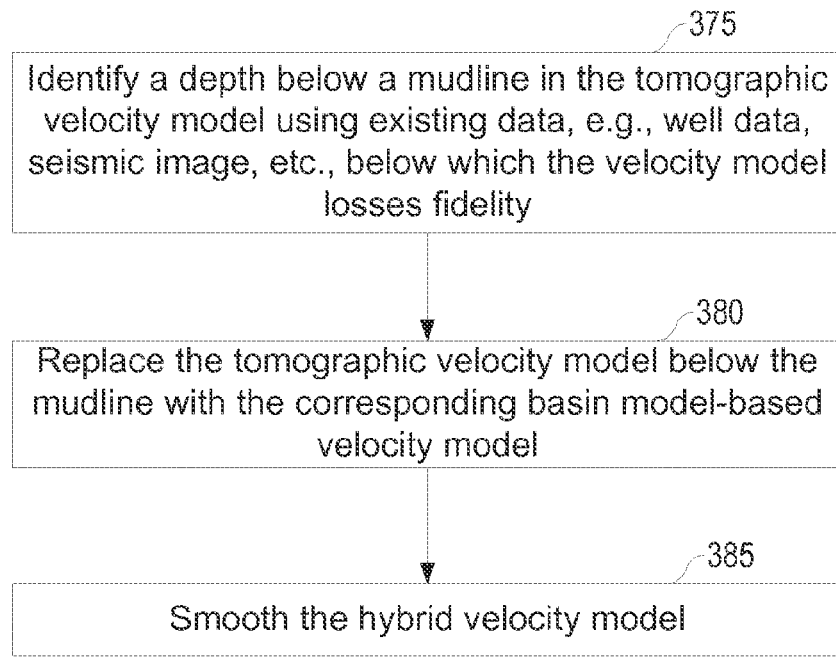
Figure 3E:
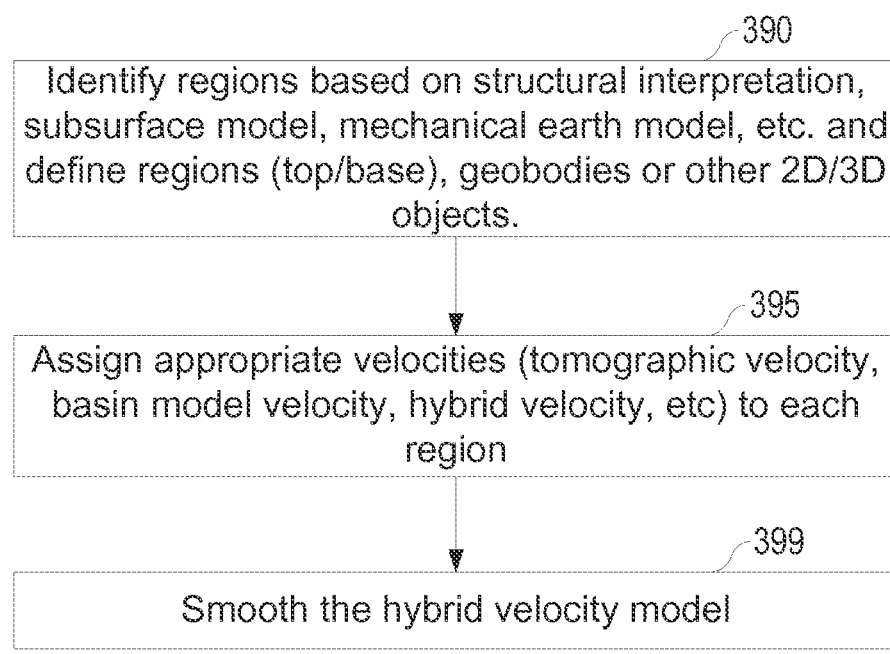

For a specific region in the velocity model, there may be multiple options for merging the two velocity models into one hybrid velocity model. FIGS. 3C-3E are flow charts illustrating respective scenarios of how to update the seismic tomographic velocity model with the velocity model derived from basin modeling in accordance with some implementations. As shown in FIG. 3C, the process first identifies the common image gathers in the seismic image at a particular region, which may require further update to its velocity model, and then determines (350) the measure of gather flatness (MGF) for this region. Note that the main goal of seismic imaging is to move the seismic events collected on the surface into the subsurface and have them focused on the locations responsible for generating the seismic events. A seismic event is not focused if the velocity model used for migrating the seismic data is incorrect. The MGF attribute is effectively a parameter for measuring the accuracy of the velocity model. For example, if the MGF is less than a predefined error $\epsilon$ (355—yes), the process may assume that the seismic tomography-based velocity model is sufficiently accurate and then use (360) it as the velocity for the particular region. Otherwise (365—no), the process may choose (365) the basin model-based velocity model to replace the tomography-based velocity model for this region. In some implementations, this process repeats itself for multiple regions in the velocity model until a hybrid velocity model is generated. Because the hybrid velocity model may have different regions coming from different velocity models, the process may further smooth (370) the hybrid velocity model.

FIG. 3D illustrates another approach of generating a hybrid velocity model. In this case, the seismic tomography-based velocity model is examined to identify (375) a depth below a mudline in the model such that the seismic tomography-based velocity model is deemed to be inaccurate. It is generally assumed that the seismic tomography-based velocity model is more accurate near the surface and gradually loses its fidelity when it is deep into the subsurface. In some implementations, the identification of the mudline may involve other types of available data, such as the well data, the seismic image, etc. After identifying the mudline, the process then replaces (380) the tomographic velocity model below the mudline with the corresponding basin model-based velocity model and generates a hybrid velocity model. Finally, the process may further smooth (385) the hybrid velocity model.

FIG. 3E illustrates yet another approach of generating a hybrid velocity model. In this case, the process identifies (390) regions in the seismic tomographic velocity model based on different types of information available, such as structural interpretation, subsurface model, mechanical earth model, etc., and defines certain regions, geobodies, or other 2D/3D objects in the velocity model that require further analysis and potential update. Next, the process assigns (395) the appropriate velocities to each of the identified regions to generate a hybrid velocity model. In some implementations, the velocity used for an identified region may be the one from the seismic tomographic velocity model or the one from the basin modeling velocity. Finally, the process may further smooth (399) the hybrid velocity model.

It should be noted that the three approaches described above for generating the hybrid velocity model are not mutually exclusive such that the use of one approach excludes the use of another approach. Actually, it is quite likely that the different approaches may be used in a complimentary manner such that different regions of the hybrid velocity model may be generated from different approaches.

Figure 4:
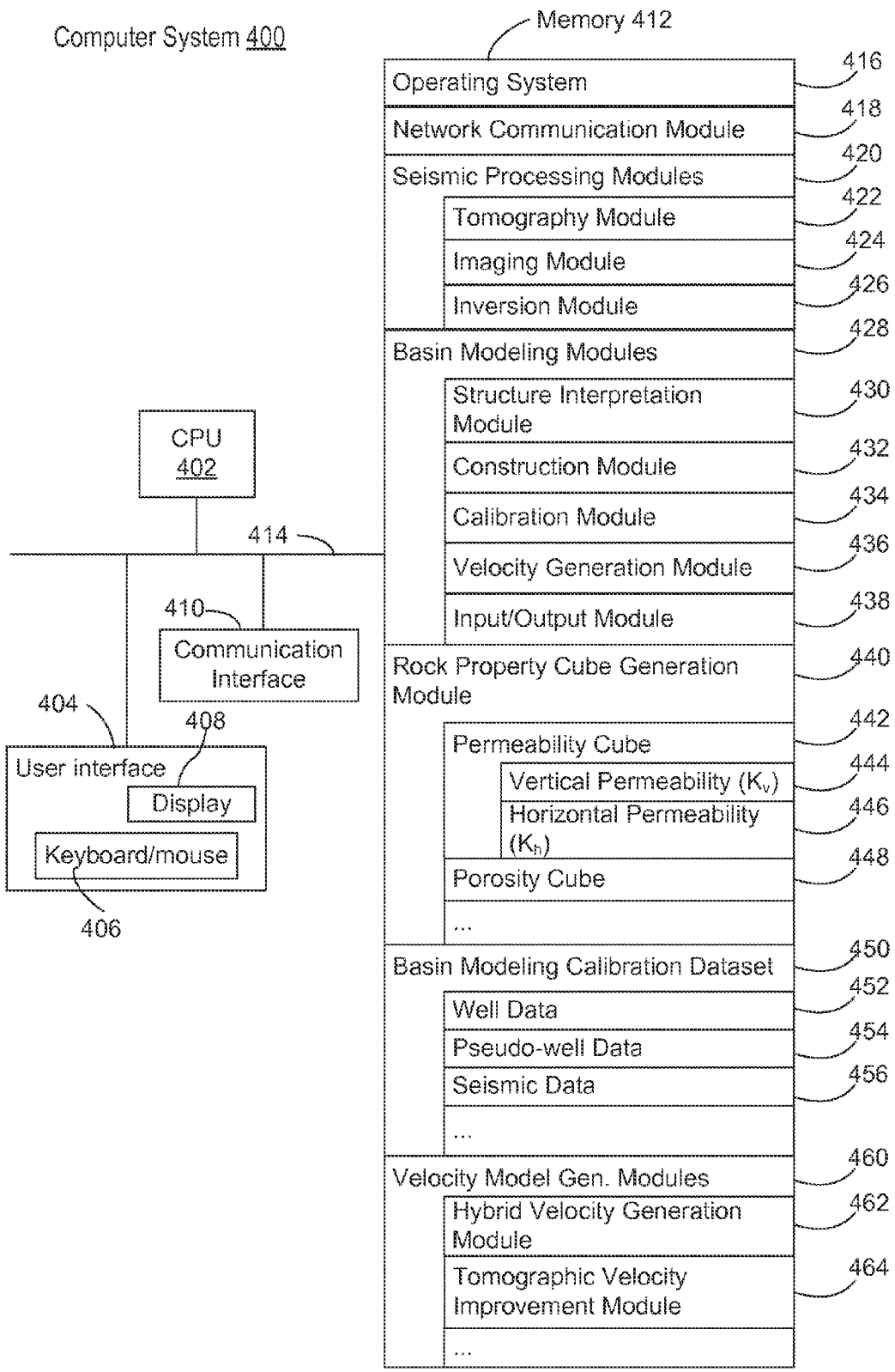
FIG. 4 is a block diagram illustrating a computer system including various program modules for using basin modeling to improve velocity models applicable to seismic data processing in accordance with some implementations.

FIG. 4 is a block diagram illustrating a computer system 400 including various program modules for using basin modeling to improve velocity models used for seismic data processing in accordance with some implementations. The computer system 400 includes one or more processors 402 for executing modules, program modules and/or instructions stored in memory 412 and thereby performing predefined operations; one or more network or other communications interfaces 410; memory 412; and one or more communication buses 414 for interconnecting these components. In some implementations, the computer system 400 includes a user input interface 404 comprising one or more input devices 406 (e.g., keyboard or mouse). In some implementation, the computer system 400 has a built-in display 408 for displaying the seismic data and velocity model, etc.

In some implementations, the memory 412 includes high-speed random access memory, such as DRAM, SRAM, DDR RAM or other random access solid state memory devices. In some implementations, the memory 412 includes non-volatile memory, such as one or more magnetic disk storage devices, optical disk storage devices, flash memory devices, or other non-volatile solid state storage devices. In some implementations, the memory 412 includes one or more storage devices remotely located from the processor(s) 402. Memory 412, or alternately one or more storage devices (e.g., one or more nonvolatile storage devices) within the memory 412, includes a non-transitory computer readable storage medium. In some implementations, the memory 412 or the computer readable storage medium of the memory 412 stores the following programs, modules and data structures, or a subset thereof:

- an operating system 416 that includes procedures for handling various basic system services and for performing hardware dependent tasks;
- a network communications module 418 for connecting the computer system 400 to other devices (e.g., a data storage device or a printing device) via the communication network interfaces 410 and one or more communication networks (wired or wireless), other wide area networks, local area networks, metropolitan area networks, etc.;
- one or more seismic processing modules 420 for processing the seismic data, including a seismic tomography module 422, a seismic imaging module 424, a seismic inversion module 426;
- one or more basin modeling modules including a geological structure interpretation module 430, a basin model construction module 432, a basin model calibration module 434, a velocity generation module 436, and an input/output module 438;
- a rock property cube generation module 440 including one or more sub-modules for generating the permeability cube 442 (which may further include the vertical permeability 444 and the horizontal permeability 446) and the porosity cube 448, etc;
- a basin modeling calibration dataset 450 including well data 452, pseudo-well data 454, and seismic data 456; and
- one or more velocity model generation modules 460 including a hybrid velocity model generation module 462, a tomographic velocity improvement module 464, etc.

In some implementations, the computer system 400 corresponds to a single computer. In some other implementations, the computer system corresponds to a distributed computer system.

While particular implementations are described above, it will be understood it is not intended to limit the invention to these particular implementations. On the contrary, the invention includes alternatives, modifications and equivalents that are within the spirit and scope of the appended claims. Numerous specific details are set forth in order to provide a thorough understanding of the subject matter presented herein. For example, it is possible to transform the seismic data from the time domain into the frequency domain and then have the data compression/decompression and multiple prediction/elimination operations performed in the frequency domain. Although the present application uses the surface-related multiple prediction as an example, it will be apparent to one of ordinary skill in the art that the subject matter may be practiced in other seismic data processing operations that may benefit from the organization of the compressed seismic traces in the FPGA coprocessor's memory without these specific details. In other instances, well-known methods, procedures, components, and circuits have not been described in detail so as not to unnecessarily obscure aspects of the implementations.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present invention. First ranking criteria and second ranking criteria are both ranking criteria, but they are not the same ranking criteria.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A method of developing a velocity model for processing a seismic dataset, comprising:
    at a computer system having a processor and memory:
        interpreting initial geological structures from the seismic dataset;
        building an initial basin model from the initial geological structures and rock properties derived from at least one of laboratory measurements, petrophysical properties, and mechanical earth models;
        validating the initial basin model using calibration data;
        determining pore pressure and effective stress from the validated initial basin model based on horizontal permeability and vertical permeability;
        transforming the effective stress into a basin model-based velocity model with one or more transform functions based on petrophysics;
        generating a seismic tomographic velocity model from the seismic data using seismic tomography;
        building a hybrid velocity model including a plurality of regions by selecting velocities from the basin model-based velocity model or from the seismic tomographic velocity model in each region; and
        using the hybrid velocity model for processing the seismic dataset to produce a high-quality seismic image to reduce oil and gas exploration risk and minimize drilling dry holes.

2. The method of claim 1, wherein validating the initial basin model further includes:
    deriving geophysical data from the initial basin model at one or more predefined locations, wherein the predefined locations include at least one of a well location, a pseudo-well location, a particular horizon, and a multi-dimensional geobody;
    comparing the derived geophysical data with calibration data; and
    modifying the initial basin model to generate a modified basin model using at least some of the calibration data when there is a mismatch between the geophysical data derived from the initial basin model and the calibration data at the predefined locations in accordance with at least one predefined criterion.

3. The method of claim 1, wherein the one or more transform functions are generated through (i) petrophysical analysis of well data and available analogs, and (ii) building one or more rock property cubes using the seismic dataset and the non-seismic data, wherein the rock property cubes honor geomechanics, burial history, stratigraphy, and diagenesis; and the method further comprising:
    extracting rock properties from the rock property cubes corresponding to predefined locations including horizons, well locations, pseudo-well locations, multi-dimensional geobodies; and
    defining transform functions using the extracted rock properties at the predefined locations.

4. The method of claim 1, wherein building a hybrid velocity model further includes:
    generating a difference between the basin model-based velocity model and the seismic tomographic velocity model;
    identifying a region in the seismic tomographic velocity model that requires further investigation, wherein the region includes an area where the difference between the seismic tomographic velocity model and the basin model-based velocity model does not satisfy a predefined threshold level;
    modifying the identified region in the seismic tomographic velocity model using the basin model-based velocity model to construct a modified velocity model; and
    smoothing the modified velocity model to build the hybrid velocity model.

5. The method of claim 1, wherein building the hybrid velocity model includes:
    performing seismic imaging using the seismic tomographic velocity model to create a first seismic image and generate common image gathers (CIGs);
    identifying regions in the first seismic image where seismic events in the CIGs are not flat to construct a set of unsatisfactory regions; and
    building the hybrid velocity model by selecting velocities from the basin model-based velocity model in the set of unsatisfactory regions and selecting velocities from the seismic tomographic velocity model elsewhere.

6. The method of claim 1, wherein building the hybrid velocity model includes:

identifying a depth in the seismic tomographic velocity model below which the seismic tomographic velocity model is deemed to be unreliable;

replacing the seismic tomographic velocity model below the identified depth with the corresponding portion of the basin model-based velocity model to construct a modified velocity model; and smoothing the modified velocity model to build the hybrid velocity model.

7. The method of claim 1, wherein building the hybrid velocity model further includes:

choosing a region in the seismic tomographic velocity model that corresponds to a multi-dimensional geobody;

assigning velocities to the chosen region based on structural interpretation of a subsurface model and a mechanical earth model to create a modified velocity model; and smoothing the modified velocity model to build the hybrid velocity model.

8. The method of claim 1, further comprising:

generating a new seismic image from the seismic dataset using the hybrid velocity model;

interpreting the new seismic image using the hybrid velocity model and the initial basin model;

revising the initial basin model and the seismic tomographic velocity model based on an interpretation result of the new seismic image; and repeating the validating, determining, and transforming steps to generate a new basin model-based velocity model and building a new hybrid velocity model based on the new basin model-based velocity model and the revised seismic tomographic velocity model.

9. The method of claim 1, further comprising:

identifying one or more velocity constraints by comparing the basin model-based velocity model with the seismic tomographic velocity model;

performing seismic tomography to the seismic dataset using the identified one or more velocity constraints thereby deriving a seismic tomography result; and generating a new seismic tomographic velocity model from the seismic tomography result.

10. The method of claim 1, wherein the calibration data is generated by:

identifying one or more reference regions in the seismic tomographic velocity model where there are mismatches between the seismic tomographic velocity model and the initial basin model;

extracting velocities from the seismic tomographic velocity model corresponding to the one or more identified reference regions; and transforming the extracted velocities into pressure data as part of the calibration data.

11. The method of claim 10, wherein the one or more reference regions include horizons, well locations, and pseudo-well locations.

12. A computer system for developing a velocity model for processing a seismic dataset, the computer system comprising:

memory;

one or more processors; and one or more program modules stored in the memory, wherein the program modules, when executed by the processors, are configured to cause the processors to perform the following operations:

interpreting initial geological structures from the seismic dataset;

building an initial basin model from the initial geological structures and rock properties derived from at least one of laboratory measurements, petrophysical properties, and mechanical earth models;

validating the initial basin model using calibration data;

determining pore pressure and effective stress from the validated initial basin model based on horizontal permeability and vertical permeability;

transforming the effective stress into a basin model-based velocity model with one or more transform functions based on petrophysics;

generating a seismic tomographic velocity model from the seismic data using seismic tomography;

building a hybrid velocity model including a plurality of regions by selecting velocities from the basin model-based velocity model or from the seismic tomographic velocity model in each region; and using the hybrid velocity model for processing the seismic dataset to produce a high-quality seismic image to reduce oil and gas exploration risk and minimize drilling dry holes.

13. A non-transitory computer readable storage medium, storing one or more programs for execution by one or more processors of a computer system for developing a velocity model for processing a seismic dataset, the one or more programs including instructions for performing the following operations:

interpreting initial geological structures from the seismic dataset;

building an initial basin model from the initial geological structures and rock properties derived from at least one of laboratory measurements, petrophysical properties, and mechanical earth models;

validating the initial basin model using calibration data;

determining pore pressure and effective stress from the validated initial basin model based on horizontal permeability and vertical permeability;

transforming the effective stress into a basin model-based velocity model with one or more transform functions based on petrophysics;

generating a seismic tomographic velocity model from the seismic data using seismic tomography;

building a hybrid velocity model including a plurality of regions by selecting velocities from the basin model-based velocity model or from the seismic tomographic velocity model in each region; and using the hybrid velocity model for processing the seismic dataset to produce a high-quality seismic image to reduce oil and gas exploration risk and minimize drilling dry holes.

* * * * *